US009049045B2

(12) United States Patent
Iyer et al.

(10) Patent No.: US 9,049,045 B2
(45) Date of Patent: Jun. 2, 2015

(54) PEER-TO-PEER FORWARDING FOR PACKET-SWITCHED TRAFFIC

(75) Inventors: Pradeep J. Iyer, Cupertino, CA (US); Keerti G. Melkote, San Jose, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 836 days.

(21) Appl. No.: 12/429,981

(22) Filed: Apr. 24, 2009

(65) Prior Publication Data

US 2010/0275017 A1    Oct. 28, 2010

(51) Int. Cl.
*H04L 12/00* (2006.01)
*H04L 12/46* (2006.01)
*H04L 12/28* (2006.01)
*H04W 76/02* (2009.01)
*H04L 29/06* (2006.01)
*H04L 12/26* (2006.01)
*H04W 8/08* (2009.01)

(52) U.S. Cl.
CPC ............. *H04L 12/4633* (2013.01); *H04L 63/04* (2013.01); *H04L 12/2602* (2013.01); *H04L 12/2859* (2013.01); *H04L 43/00* (2013.01); *H04W 8/082* (2013.01); *H04W 76/023* (2013.01)

(58) Field of Classification Search
CPC ........... G06F 15/17312; G06F 3/0635; H04W 76/023; H04W 8/082; H04L 12/2602; H04L 12/2859; H04L 43/00; H04L 12/4633; H04L 63/04
USPC .......................................... 713/153; 709/244
See application file for complete search history.

(56) References Cited

U.S. PATENT DOCUMENTS

| 6,076,168 | A |  | 6/2000 | Fiveash et al. |  |
|---|---|---|---|---|---|
| 6,580,704 | B1 |  | 6/2003 | Wellig et al. |  |
| 7,130,921 | B2 | * | 10/2006 | Goodman et al. | 709/244 |
| 7,206,859 | B2 | * | 4/2007 | Narayanan et al. | 709/238 |
| 7,328,280 | B2 | * | 2/2008 | Takeda et al. | 709/245 |
| 7,616,613 | B2 | * | 11/2009 | Sanzgiri et al. | 370/338 |
| 7,639,681 | B2 | * | 12/2009 | Kelly et al. | 370/389 |
| 7,852,767 | B2 | * | 12/2010 | Twiss | 370/235 |

(Continued)

OTHER PUBLICATIONS

Hanks, Li, Farinacci & Traina, Network Working Group Request for Comments: 1701, Category: Informational, "Generic Routing Encapsulation (GRE)", Oct. 1994, pp. 1-8.

(Continued)

*Primary Examiner* — Jung Kim
*Assistant Examiner* — Thomas Ho
(74) *Attorney, Agent, or Firm* — Ying Wang

(57) ABSTRACT

One of the embodiments is directed to establishing peer-to-peer tunnels between clients in a mobility domain. Normally, clients attached to a network having access nodes connected to a central controller transfer all traffic through the central controller via tunnels between the access node and the central controller. A mobility manager operating in the controller tracks access nodes connected to the controller, and clients connected to those access nodes. When the mobility controller recognizes traffic passing between clients in its mobility domain that is eligible for peer-to-peer forwarding, it instructs the access nodes supporting the clients to establish a peer-to-peer tunnel between the nodes, and direct the client traffic through this peer-to-peer tunnel. The peer-to-peer tunnel may be session based, or may be aged. Eligibility of traffic for peer-to-peer tunnels may be controlled by rules, such as limiting peer-to-peer tunnels by source or destination, by port or protocol, and the like.

26 Claims, 3 Drawing Sheets

(56) References Cited

U.S. PATENT DOCUMENTS

| | | |
|---|---|---|
| 8,032,652 B2 | 10/2011 | Iyer |
| 8,085,793 B2* | 12/2011 | Krishnan et al. ............. 370/400 |
| RE43,127 E | 1/2012 | Wentink |
| 2004/0185777 A1 | 9/2004 | Bryson |
| 2006/0018291 A1 | 1/2006 | Patel et al. |
| 2006/0190719 A1 | 8/2006 | Rao et al. |
| 2007/0008922 A1 | 1/2007 | Abhishek et al. |
| 2007/0025355 A1* | 2/2007 | Cohen et al. ................ 370/392 |
| 2007/0064605 A1 | 3/2007 | Ho et al. |
| 2007/0104138 A1 | 5/2007 | Rudolf et al. |
| 2007/0157303 A1 | 7/2007 | Pankratov |
| 2007/0253371 A1* | 11/2007 | Harper et al. ................ 370/331 |
| 2008/0181113 A1 | 7/2008 | Narayanan et al. |
| 2008/0291846 A1* | 11/2008 | Lu ................................ 370/254 |
| 2009/0080441 A1 | 3/2009 | Krishnan et al. |
| 2009/0316687 A1* | 12/2009 | Kruppa ........................ 370/352 |
| 2010/0067446 A1 | 3/2010 | Oulai et al. |
| 2010/0220738 A1 | 9/2010 | Sarikaya |
| 2010/0315992 A1 | 12/2010 | Turányi |

OTHER PUBLICATIONS

Hanks, Li, Farinacci & Traina, Network Working Group Request for Comments: 1702, Category: Informational, "Generic Routing Encapsulation over IPv4 Networks", Oct. 1994, pp. 1-4.

Farinacci et al., Network Working Group Request for Comments: 2784, Category: Standards Track, "Generic Routing Encapsulation (GRE)", Mar. 2000, pp. 1-6.

Dommety, Network Working Group Request for Comments: 2890, Category: Standards Track, "Key and Sequence Number Extensions to GRE", Sep. 2000, pp. 1-7.

U.S. Appl. No. 12/433,610, Non-Final Office Action, mailed Dec. 17, 2010.

U.S. Appl. No. 13/233,976, Non-Final Office Action, mailed Apr. 3, 2012.

U.S. Appl. No. 13/233,976, Final Office Action, mailed Sep. 12, 2012.

* cited by examiner

PEER-TO-PEER FORWARDING FOR PACKET-SWITCHED TRAFFIC

BACKGROUND OF THE INVENTION

The present invention relates to digital networks, and in particular, to the problem of routing traffic in controller-based digital networks.

Modern digital networks operating under IEEE 803.2 and 802.11 standards are called upon to support a wide range of wired and wireless clients.

Such systems usually comprise one or more controllers, each controller supporting one or more access nodes which provide wireless and wired network services to clients. In modern wireless systems, such access nodes may be located at some distance from the controller, communicating with the controller through the routed network. In operation, such systems provide secure network connectivity.

In operation, traffic to and from client systems connected to an access node passes to the central controller, commonly through the use of a tunnel. As understood in the art, IP tunneling is a method of connecting two disjoint Internet Protocol (IP) networks using encapsulation. In such tunneling, every IP packet with addressing information of its source and destination IP networks, is encapsulated within another packet prior to being sent through the intermediate network. Such encapsulation allows traffic between, for example, the controller and an access node, to be routed through the larger switched network. As is known in the art, such tunnels may be encrypted, such as with GRE tunnels, providing additional security. Tunnels are described, for example, in RFC 1701, RFC 1702, RFC 2784, and RFC 2890.

While the use of tunnels allows remote access nodes to provide seamless access to services, this architecture does impose a price, routing all traffic through the (central) controller. If a remote user is connecting to a corporate server, the necessity of routing all that traffic through the controller does not impose much of a penalty. But if a user at a remote location is trying to send a large file, or open a multimedia stream such as SIP connection, to another remote user located ten feet away, the central controller architecture means that all that traffic must be routed through the central controller, introducing the potential for delays and bottlenecks.

What is needed is a way to maintain the benefits of the central controller architecture while not restricting local traffic.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods tunneling traffic in a digital network. A digital network has one or more central controllers to which a plurality of access nodes are connected. Each access node provides a combination of wireless and/or wired access to resources available through the central controller. The access nodes may be directly connected to the controller, or they may connect to the controller through routed networks such as the corporate Intranet, wider Internet, through private networks such as VPNs, or through a combination of wired and wireless backhaul.

In operation, the access nodes establish communications with the controller using tunnels. An example of a tunnel is a GRE tunnel. Traffic to and from clients connected to an access node is routed through the tunnel and through the central controller to which the access node is connected.

In accordance with the invention, a mobility controller process runs in the controller, monitoring traffic to and from clients. The set of access nodes known to the controller and other associated controllers is defined as the mobility domain. When the mobility controller recognizes that traffic is being sent from a first client in the mobility domain to a second client in the mobility domain, the mobility controller evaluates whether the traffic is eligible for peer-to-peer forwarding. If the traffic is eligible for peer-to-peer forwarding, the mobility manager instructs the access node to which the first client is connected to establish a peer-to-peer tunnel to the access node to which the second client is attached, and to direct the traffic through the peer-to-peer tunnel.

Peer-to-peer tunnels may be established between any two clients in the mobility domain, or may be established on an authenticated basis. Peer-to-peer tunnels may be limited or authenticated on a per-user basis, and may be limited to certain protocols, ports, and/or destinations. Peer-to-peer tunnels may be kept alive on a session basis, or may be aged and terminated automatically if unused for a predetermined period of time.

Figure 1:
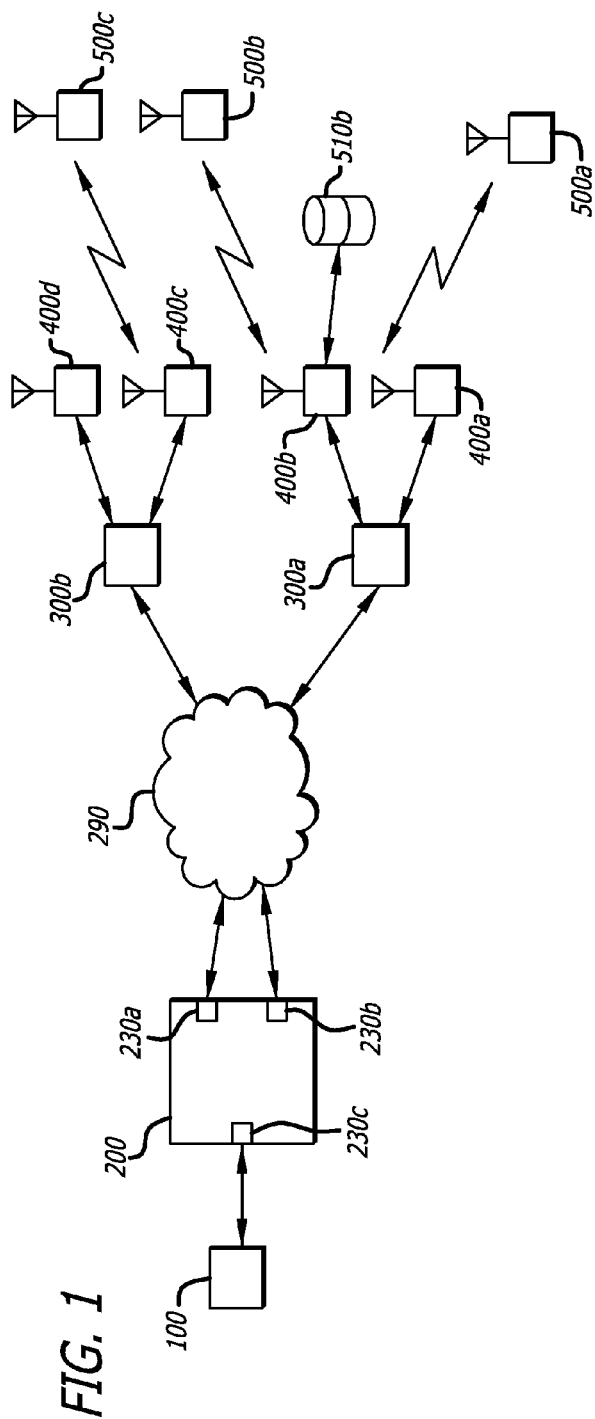
FIG. 1 shows a network.

FIG. 1 shows a digital network. Router 100 connects to a network, not shown. Router 100 also provides services to controller 200. Controller 200 has a plurality of ports, 230*a*, 230*b* for supporting devices such as access nodes 400*a*, 400*b*, 400*c*, 400*d*.

As shown in FIG. 1, these ports 120*a*, 120*b* connect through switched network 290 to routers 300*a* and 300*b*.

Access nodes 400*a*, 400*b*, 400*c*, 400*d* provide wireless and possibly wired services to clients. As shown in FIG. 1, wireless client 500*a* is connected to access node 400*a*. Access node 400*b* supports wireless client 500*b* and wired client 510*b*. Access node supports wireless client 500*c*.

Figure 2:
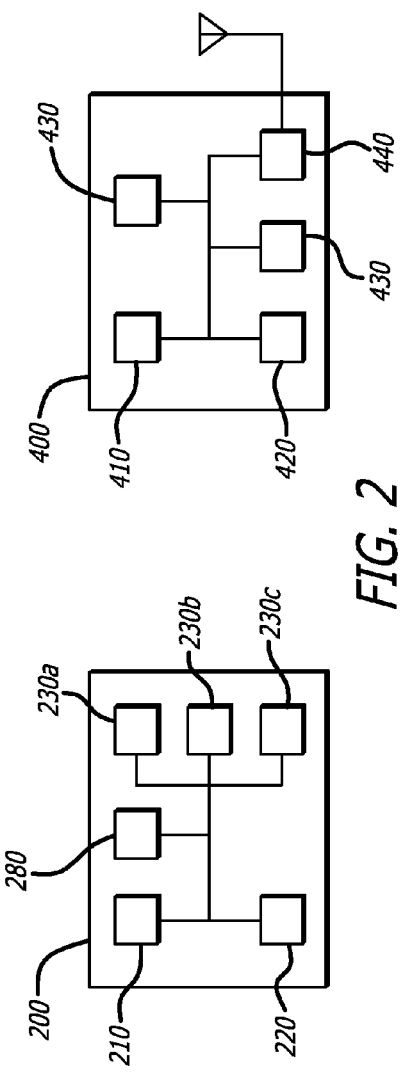
FIG. 2 shows details of network devices.

As shown in FIG. 2, controllers 200 are a purpose-built digital devices having a CPU 210, memory hierarchy 220, and a plurality of network interfaces 230. CPU 210 may be a MIPS-class processor from companies such as Raza Microelectronics or Cavium Networks, although CPUs from companies such as Intel, AMD, IBM, Freescale, or the like may also be used. Memory hierarchy 220 includes read-only memory for device startup and initialization, high-speed read-write memory such as DRAM for containing programs and data during operation, and bulk memory such as hard disk or compact flash for permanent file storage of programs and data. Network interfaces 230 are typically IEEE 802.3 Ethernet interfaces to copper, although high-speed optical fiber interfaces may also be used. Controller 200 typically operates under the control of purpose-built embedded software, typically running under a Linux operating system, or an operating system for embedded devices such as VXWorks. Controller 200 may have dedicated hardware for encryption, and/or for routing packets between network interfaces 230.

Similarly, as understood by the art, access nodes 400*a*, 400*b*, 400*c* and 400*d*, are also purpose-built digital devices. These access nodes include CPU 410, memory hierarchy 420, wired interface 430, and wireless interface 440. As with controller 200, the CPU commonly used for such access nodes is a MIPS-class CPU such as one from Raza Microelectronics or Cavium Networks, although processors from other vendors such as Intel, AMD, Freescale, and IBM may be used.

The memory hierarchy comprises read-only storage for device startup and initialization, fast read-write storage such as DRAM for holding operating programs and data, and permanent bulk file storage such as compact flash. Wireless access nodes 300 typically operate under control of purpose-built programs running on an embedded operating system such as Linux or VXWorks. Wireless interface 340 is typically an interface operating to the family of IEEE 802.11 standards including but not limited to 802.11a, b, g, and/or n. Multiple wired interfaces 430 may be provided, with one wired interface 430a being used to connect the access node to its controller, and the other wired interfaces 430b used to host wired devices as clients. While wired interfaces such as 802.3 Ethernet may be used, USB may also be used to support printers, mass storage devices, and wireless back-haul links such as 3G or WiMAX modems.

While FIGS. 1 and 2 depict a wired backhaul connecting access nodes 400 to controller 200, a combination of wired and wireless backhauls may also be used, for example, using WiMAX, 3G, or other high-speed wireless connections. While a wired connection to a modem such as an ADSL modem or a cable modem may be used, such a modem may also be built into access node 400.

Routers 300 are also purpose-built digital devices, and similar to controller 200, they contain a CPU, memory hierarchy, and a plurality of interfaces. Routers typically run dedicated software devoted to the tasks required. Routers are commercially available from a number of companies such as Cisco-Linksys, Hewlett Packard, D-Link, and others.

Wireless clients 500 are also digital devices, similarly having CPU 510, memory hierarchy 520, wireless interface 530, and I/O devices 540. As examples, wireless device 500 may be a general purpose computer such as a laptop, or may be a purpose-built device such as a Wi-Fi phone or a handheld scanner. In a general-purpose computer, CPU 510 may be a processor from companies such as Intel, AMD, Freescale, or the like. In the case of purpose-built devices, Acorn or MIPS class processors may be preferred. Memory hierarchy 520 comprises the similar set of read-only memory for device startup and initialization, fast read-write memory for device operation and holding programs and data during execution, and permanent bulk file storage using devices such as flash, compact flash, and/or hard disks. Additional I/O devices 540 may be present, such as keyboards, displays, speakers, bar-code scanners, and the like.

Figure 3:
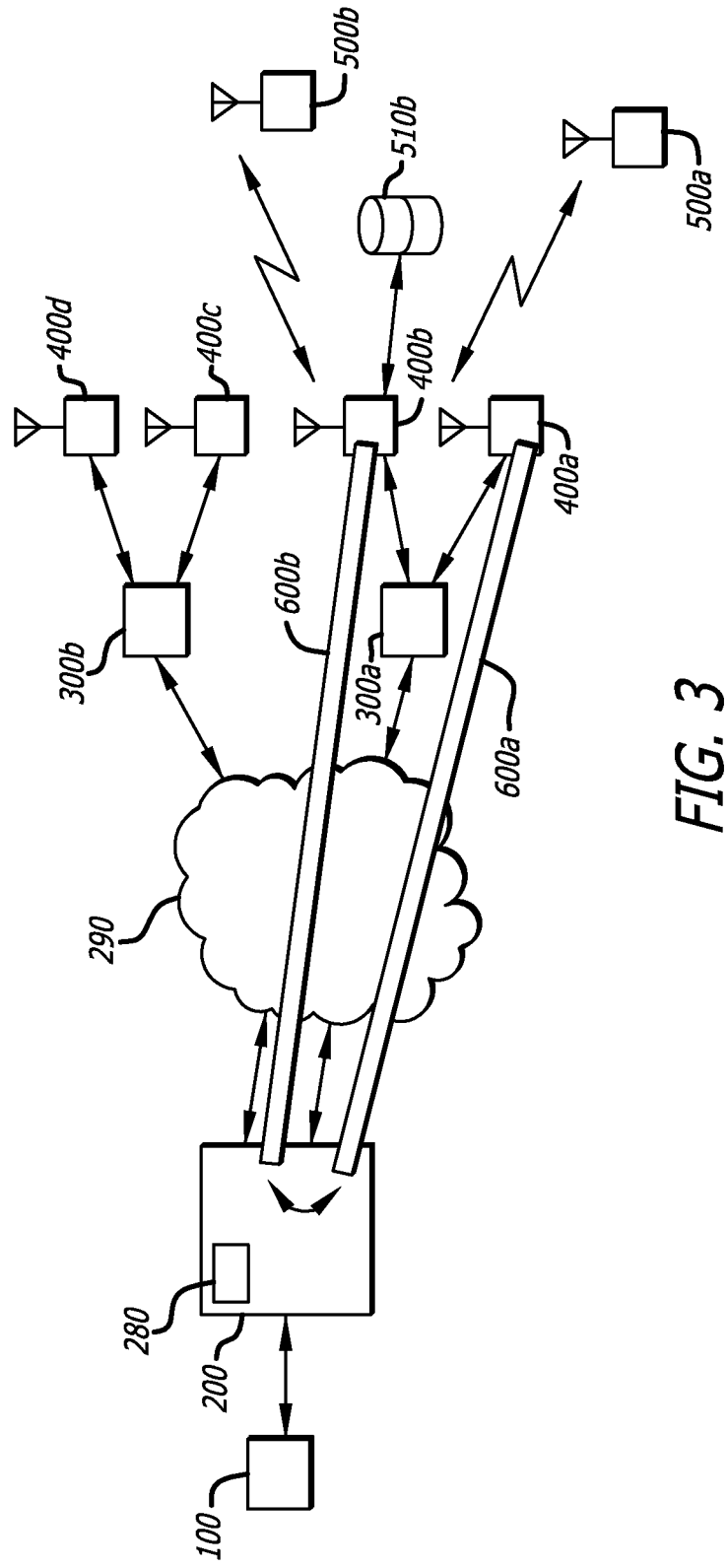
FIG. 3 shows tunnels in a network.

In operation and as shown in FIG. 3, access nodes 400a, 400b, 400c, 400d establish communications with controller 200, in the case of FIG. 3, through routers 300 and switched network 200. As shown for access nodes 400a and 400b, tunnels 600a, 600b such as GRE tunnels are established between the access node and controller 200. Such tunnels 600a, 600b may be established on a per-access node basis, or on a per network basis, with one tunnel established for each advertised wireless network (BSSD) or one tunnel established for each wired port on an access node.

Assume wireless client 500a is connected to access node 400a, and client 500b is connected to access node 400b. When client 500a establishes a connection to client 500b, traffic from client 500a passes through access node 400a, tunnel 600a, to controller 200. Controller 200 identifies the traffic destination as client 500b, and sends the traffic though tunnel 600b to access node 400b and client 500b.

This routing is performed by controller 200 using the IP addresses of clients 500a and 500b, as well as the MAC (media access controller) addresses of clients 500a, 500b and access nodes 400a and 400b. When client 500a wishes to send data to client 500b, it in essence forms an IP packet with client 500b's IP address as the destination, and with client 500a's IP address and MAC address as the source. This information is encapsulated and sent to controller 200.

Controller 200 keeps tables of all access nodes it controls, and all clients associated with those nodes, including IP and MAC addresses. In this way, when it examines the packet from client 500a, it can determine that client 500b, the destination, is connected to access node 400b, and direct the traffic through tunnel 600b to that access point, and the destination device.

Even if clients 500a and 500b are sitting in the same office suite, ten meters apart, traffic between them is routed through controller 200.

According to the present invention, mobility manager 280 is a process running in controller 200. By accessing controller 200's tables of access nodes and their clients, mobility manager 280 can detect when a client is exchanging data with another client in its mobility domain.

Figure 4:
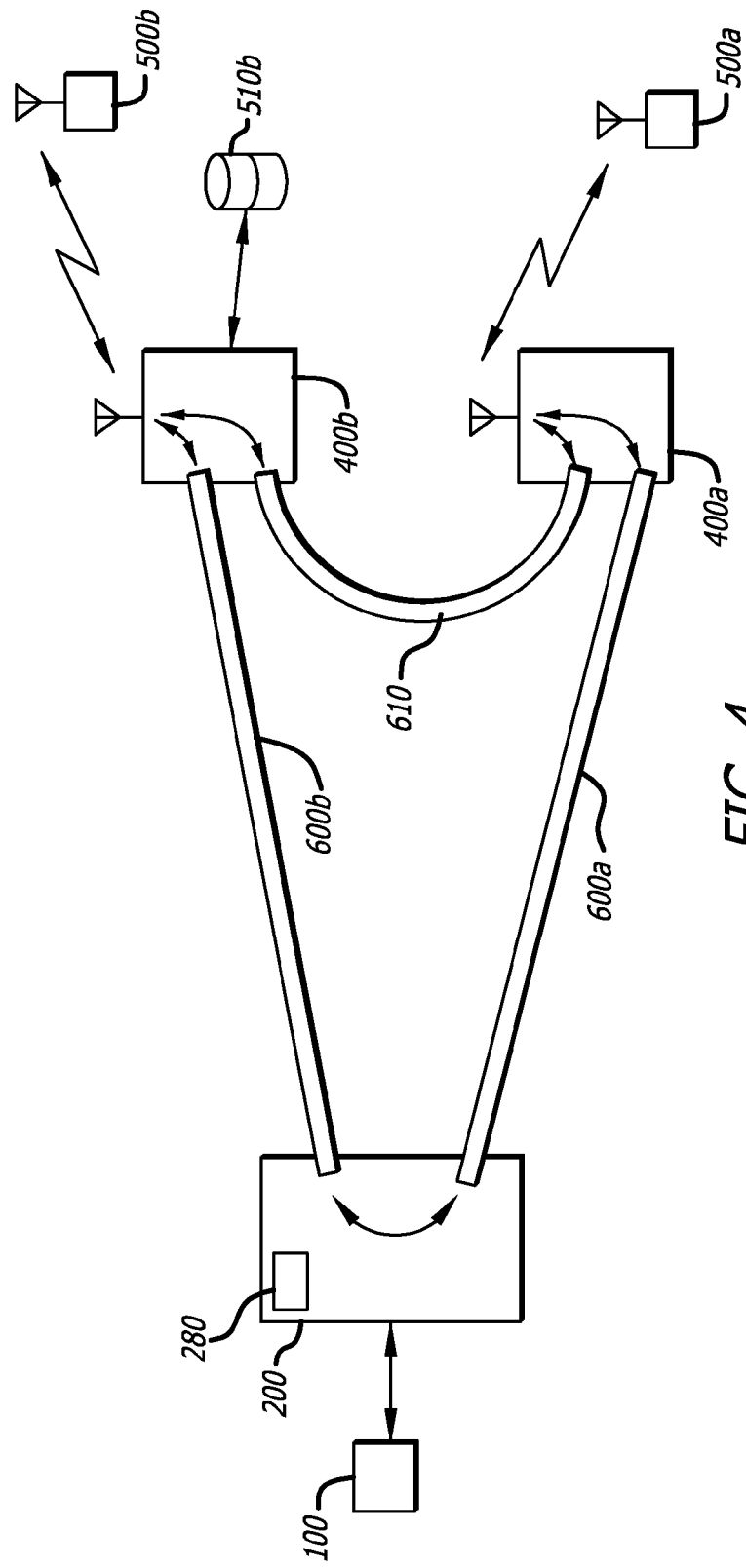
FIG. 4 shows an additional network.

As shown in FIG. 4, when mobility manager 280 detects that client 500a is communicating with client 500b, also in the mobility domain of controller 200, mobility manager 280 evaluates if this traffic is eligible for peer-to-peer forwarding. If the traffic is eligible for peer-to-peer forwarding, mobility manager 280 instructs access node 400a to establish peer-to-peer tunnel 610 between access node 400a and access 400b, and to route that traffic between clients 500a and 500b through tunnel 610 rather than through tunnel 600a. While the peer-to-peer tunnel is being established, traffic between clients flows through the controller. In this manner traffic between clients 500a and 500b rather than traveling through tunnels 600a and 600b and controller 200, instead travels through tunnel 610 once the tunnel is established.

A peer-to-peer tunnel may be established any time mobility manager 280 detects connections and data exchanges between clients in its mobility domain. Or, peer-to-peer tunnels may be evaluated and only established on an authenticated basis according to pre-established rules. Peer-to-peer tunnels may be limited by client identity, including but not limited to client IP address, client MAC address, client authentication, and the like, destination identity, port, traffic type, and so on. As an example, assume a high-speed printer is connected as a client to access node 400a. Appropriate rules for the establishment of peer-to-peer tunnels for a printer would be limited to ports and protocols needed for printer use for local authorized users, with no access allowed for guests. Similarly, traffic to e-mail servers would not be eligible for peer-to-per forwarding, so that such traffic would always pass through controller 280 and be subject to firewalling, virus detection, deep packet inspection, and the like. As another example, network time protocol traffic on port 123 would be eligible for peer-to-peer forwarding to reduce transit delays for time data.

It should be understood that which end of the traffic causes the tunnel to be established is immaterial. As an example, consider a user sending queries to a remote database server. It does not matter if the traffic triggering the formation of a peer-to-peer tunnel is the transmission of a query from the client to the database server, or the transmission of the query result from the database server to the client.

Peer-to-peer tunnels may be established on a session basis, or may be aged. As an example, for a device such as a high-speed printer, a peer-to-peer tunnel with a timeout of thirty seconds may be appropriate; if no activity passes through the tunnel for that predetermined period of time, the tunnel is discontinued. If bursts of traffic between two clients exceed the time-out period, the peer-to-peer tunnel will be discontinued, but the next traffic between the clients, which will once more be routed through controller 200, causes the peer-to-peer tunnel to be re-established.

Assume as an example file/database server 510b is connected via a wired connection to access node 400b. Peer-to-peer tunnels may be permitted for authorized users of the database for the specific protocols and ports used for database access, with all other traffic routed through controller 200 for filtering, firewalling, and authentication. As an example, while database traffic using port 3306 between server 510b and client 500a may be routed through a peer-to-peer tunnel 610, traffic on port 80 between client 500a and server 510b is still routed initially through controller 200.

When multiple controllers 200 are present within a mobility domain, mobility managers 280 operating in each controller may cooperate in supporting peer-to-peer tunneling within the mobility domain. In one embodiment, a mobility manager 280 broadcasts updates of connected clients to other mobility managers in the mobility domain. These updates may be made on a periodic basis, may be event-driven, such as on client connection or disconnection, or on a combination. By providing the ability for a mobility manager to identify clients attached to a different controller that are still within the mobility domain, peer-to-peer forwarding may be extended to cross controller boundaries.

In another embodiment involving multiple controllers, mobility managers 280 may send queries to other mobility managers within the domain to inquire if a destination is a client of another mobility manager within the mobility domain. It may be useful in some embodiments to apply additional authentication when controller boundaries are crossed. As an example, consider an enterprise network spread over many locations, perhaps over many time zones. While establishing a peer-to-peer tunnel between a streaming media device such as a security webcam and a monitoring station offloads that streaming traffic from passing through the controller, other policies may wish to restrict access to such cameras to only users connected to the controller at the particular site, not allowing access across controller boundaries, or only allowing access across controller boundaries to certain classes of users.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A non-transitory computer readable medium bearing instructions which, when executed by one or more hardware processors, causes performance of operations comprising:
   determining that data traffic is passing through a network device while propagating from (i) a first client communicatively coupled to a first access node to (ii) a second client communicatively coupled to a second access node;
   determining that the data traffic passing through the network device from the first client to the second client is eligible for peer-to-peer forwarding:
   instructing, by the network device, the first access node to open a tunnel to the second access node, wherein the tunnel does not include the network device;
   wherein additional data traffic eligible for peer-to-peer forwarding travels between the first client and the second client through the tunnel without passing through the network device; and
   wherein additional data traffic in eligible for peer-to-peer forwarding travels between the first client and the second client passing through the network device.

2. The medium of claim 1 wherein the communicative coupling between at least one of the first client and the first access node and the communicative coupling between the second client and the second access node being a wireless connection.

3. The medium of claim 1 wherein the communicative coupling between at least one of (i) the first client and the first access node and (ii) the second client and the second access node is a wired connection.

4. The medium of claim 1 wherein the tunnel from the first access node to the second access node is encrypted so that no intermediary device along the tunnel between the first access node and the second access node has access to data in a non-encrypted state after the data forming at least part of the data traffic is encrypted prior to transmission over the tunnel.

5. The medium of claim 1 wherein the tunnel from the first access node to the second access node is a Generic Routing Encapsulation (GRE) tunnel.

6. The medium of claim 1 wherein, prior to the instructing operation the data traffic passes through a first tunnel between the network device and the first access node and a second tunnel between the network device and the second access node.

7. The medium of claim 6 wherein the first tunnel and the second tunnel are Generic Routing Encapsulation (GRE) tunnels.

8. The medium of claim 1, wherein the determining that the data traffic is eligible for peer-to-peer forwarding is based on authenticating one or both of the first client and the second client.

9. The medium of claim 1 wherein the determining that the data traffic is eligible for peer-to-peer forwarding is based on a protocol in use to transfer the data traffic between the first client and the second client.

10. A non-transitory computer readable medium instructions which, when executed by one or more hardware processors, causes performance of operations comprising:
    determining that data traffic, from a first client communicatively coupled to a first access node, is flowing through a first controller and through a second controller toward a second client communicatively coupled to a second access node;
    at least in response to determining that the data traffic from the first client to the second client is travelling through both the first controller and the second controller;
    instructing the first access node to open a tunnel from the first access node to the second access node over which data traffic eligible for peer-to-peer forwarding travels between the first client and the second client without passing through the first controller and without passing through the second controller;
    wherein data traffic ineligible for peer-to-peer forwarding travels between the first client and the second client passing through both the first controller and the second controller.

11. The medium of claim 1, wherein the operations further comprise: sending a first portion of the data traffic through the tunnel and maintaining a data path between the controller and the first access node to pass a second portion of the data traffic from the first access node through the controller, wherein the second portion of the data traffic is different from the first portion of the data traffic.

12. The medium of claim 1, wherein the determining that the data traffic is eligible for peer-to-peer forwarding comprises determining, by a controller, that the first client and the second client are within a mobility domain of the controller.

13. The medium of claim 1, wherein the determining that the data traffic is eligible for peer-to-peer forwarding comprises determining an identity of the second client and evaluating whether the tunnel is permitted for a data transmission to the second client.

14. The medium of claim 1, wherein the determining that the data traffic is eligible for peer-to-peer forwarding comprises determining that the data traffic is a first type of data and determining that the tunnel is permitted for data of the first type.

15. The medium of claim 1, wherein the determining that the data traffic is eligible for peer-to-peer forwarding comprises evaluating characteristics of the data traffic and determining that the tunnel is permitted for data having the characteristics of the data traffic.

16. The medium of claim 15, wherein the characteristics of the data traffic comprises one or more of (i) an Internet Protocol (IP) address of one of the first client and the second client; (ii) an Media Access Control (MAC) address of one of the first client and the second client; (iii) a type of data corresponding to the data traffic.

17. The medium of claim 1, wherein the determining that the data traffic is eligible for peer-to-peer forwarding comprises determining a port associated with one of the first client and the second client that is activated for routing of the data traffic, and determining that the tunnel is permitted for the data traffic passing through the port.

18. The medium of claim 1, wherein the determining that the data traffic is eligible for peer-to-peer forwarding comprises authenticating a user of the first client and determining that the tunnel is permitted based on authenticating of the user of the first client.

19. A system comprising:
  at least one device including a hardware processor;
  wherein the system is configured to perform operations comprising:
    determining that data traffic is passing through a network device while propagating from (i) a first client communicatively coupled to a first access node to (ii) a second client communicatively coupled to a second access node;
    determining that the data traffic passing through the network device from the first client to the second client is eligible for peer-to-peer forwarding;
    instructing, by the network device, the first access node to open a tunnel to the second access node, wherein the tunnel does not include the network device;
    wherein additional data traffic eligible for peer-to-peer forwarding travels between the first client and the second client through the tunnel without passing through the network device; and
    wherein additional data traffic ineligible for peer-to-peer forwarding travels between the first client and the second client passing through the network device.

20. The system of claim 19 wherein the communicative coupling between at least one of (i) the first client and the first access node and (ii) the second client and the second access node is a wireless connection.

21. The system of claim 19, wherein the operations further comprise subsequent to opening a tunnel between the first node and the second node without the network device, sending a first data set through the tunnel that does not include the network device and sending a second data set through a communication path that includes the network device.

22. The system of claim 19, wherein determining that the data traffic is eligible for peer-to-peer forwarding comprises determining an identity of the second client and evaluating whether the tunnel is permitted for a data transmission to the second client.

23. The system of claim 19, wherein determining that the data traffic is eligible for peer to peer forwarding comprises determining that the data traffic is a first type of data and determining that the tunnel is permitted for data of the first type.

24. The system of claim 19, wherein determining that the data traffic is eligible for peer-to-peer forwarding comprises evaluating characteristics of the data traffic and determining that the tunnel is permitted for data having the characteristics of the data traffic.

25. The system of claim 24,
  wherein characteristics of the data traffic comprises one or more of (i) an Internet Protocol (IP) address of one of the first client and the second client; (ii) an Media Access Control (MAC) address of one of the first client and the second client; (iii) a type of data corresponding to the data traffic;
  wherein the instructing operation is further based on the characteristics of the data traffic.

26. The system of claim 19, wherein determining that the data traffic is eligible for peer-to-peer forwarding comprises determining a port associated with one of the first client and the second client that is activated for routing of the data traffic, and determining that the tunnel is permitted for the data traffic passing through the port.

* * * * *